United States Patent
Lunttila et al.

(10) Patent No.: US 10,743,200 B2
(45) Date of Patent: Aug. 11, 2020

(54) DORMANT CELL RRM MEASUREMENT REPORTING

(71) Applicant: Nokia Solutions and Networks Oy, Espoo (FI)

(72) Inventors: Timo Erkki Lunttila, Espoo (FI); Tero Henttonen, Espoo (FI)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 15/125,767

(22) PCT Filed: Mar. 14, 2014

(86) PCT No.: PCT/EP2014/055131
§ 371 (c)(1),
(2) Date: Sep. 13, 2016

(87) PCT Pub. No.: WO2015/135589
PCT Pub. Date: Sep. 17, 2015

(65) Prior Publication Data
US 2017/0013490 A1    Jan. 12, 2017

(51) Int. Cl.
*H04W 24/10* (2009.01)
*H04W 52/02* (2009.01)
*H04W 84/04* (2009.01)

(52) U.S. Cl.
CPC ....... *H04W 24/10* (2013.01); *H04W 52/0206* (2013.01); *H04W 84/045* (2013.01);
(Continued)

(58) Field of Classification Search
CPC . H04W 24/10; H04W 52/0206; H04W 24/00; H04W 72/04
See application file for complete search history.

(56) References Cited

U.S. PATENT DOCUMENTS

| | | | | |
|---|---|---|---|---|
| 2006/0084437 A1* | 4/2006 | Furuya | ................... | H04W 36/18 455/436 |
| 2008/0188215 A1* | 8/2008 | Bergstrom | ............ | H04W 48/20 455/424 |

(Continued)

FOREIGN PATENT DOCUMENTS

| | | |
|---|---|---|
| CN | 1770922 A | 5/2006 |
| CN | 101536585 A | 9/2009 |

(Continued)

OTHER PUBLICATIONS

International Search Report and Written Opinion received for corresponding Patent Cooperation Treaty Application No. PCT/EP2014/055131, dated Nov. 21, 2014, 13 pages.

(Continued)

*Primary Examiner* — Anez C Ebrahim
(74) *Attorney, Agent, or Firm* — Squire Patton Boggs (US) LLP

(57) ABSTRACT

The present invention provides apparatuses, methods, computer programs, computer program products and computer-readable media regarding dormant cell RRM (Radio Resource Management) measurement reporting. Certain aspects of the present invention include configuring, at a base station, a measurement configuration message for causing user equipment served by the base station to perform and report measurements on cells, the measurement configuration message comprising information indicating criteria impacting a measurement reporting procedure with respect to the cells, the said criteria being related to at least one of the state of a cell, a type of a cell, and a type of a signal used for the measurements of the cells, and transmitting said configured measurement configuration message to the user equipment.

16 Claims, 6 Drawing Sheets

(52) U.S. Cl.
CPC ...... *Y02D 70/1242* (2018.01); *Y02D 70/1262* (2018.01); *Y02D 70/1264* (2018.01)

(56) References Cited

U.S. PATENT DOCUMENTS

2010/0330989 A1* 12/2010 Song .................... H04W 48/16
455/434
2013/0281076 A1 10/2013 Damnjanovic et al.

FOREIGN PATENT DOCUMENTS

| CN | 102695188 A | 9/2012 |
|----|-------------|--------|
| CN | 103444235 A | 12/2013 |
| EP | 2 645 803 A1 | 10/2013 |
| EP | 2787760 A1 | 10/2014 |
| WO | 2013/067676 A1 | 5/2013 |

OTHER PUBLICATIONS

NTT Docomo, "Views on Small Cell On/Off with Small Cell Discovery", 3GPP TSG RAN WG1 Meeting #74bis, R1-134496, 5 pages.
Huawei, "Enhancements of RRM measurements for small cell on/off", 3GPP TSG RAN WG1 Meeting #76, R1-140038, 4 pages.
Huawei, "Small cell on/off transition time reduction", 3GPP TSG RAN WG1 Meeting #76, R1-140037, 4 pages.
Chinese Office Action issued in corresponding Chinese Patent Application No. 201480078745.8 dated Mar. 26, 2019.
Office Action issued in corresponding Taiwanese Patent Application No. 104107851 dated Oct. 18, 2018.
Chinese Office Action issued in corresponding Chinese Patent Application No. 2014800787458 dated Oct. 28, 2019.
Indonesia Substantive Examination Report Stage I corresponding to Indonesia Appln. No. P00201606764, dated Feb. 10, 2020.

\* cited by examiner

Fig. 2

| Radio fame # | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| Legacy cell | PSS / SSS / CRS | PSS / SSS / CRS | PSS / SSS / CRS | PSS / SSS / CRS | PSS / SSS / CRS | PSS / SSS / CRS | PSS / SSS / CRS | PSS / SSS / CRS | PSS / SSS / CRS | PSS / SSS / CRS | PSS / SSS / CRS | PSS / SSS / CRS | PSS / SSS / CRS | PSS / SSS / CRS |

21

| Radio fame # | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| Rel-12 cell OFF | DS | | | | DS | | | | DS | | | | DS | |

22

| Radio fame # | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| Rel-12 cell ON | DS + PSS / SSS / CRS | PSS / SSS / CRS | PSS / SSS / CRS | PSS / SSS / CRS | DS + PSS / SSS / CRS | PSS / SSS / CRS | PSS / SSS / CRS | PSS / SSS / CRS | DS + PSS / SSS / CRS | PSS / SSS / CRS | PSS / SSS / CRS | PSS / SSS / CRS | DS + PSS / SSS / CRS | PSS / SSS / CRS |

23 ated as an SCell. In order to assist in the network in this decision making, several measurement events have been defined in E-UTRAN. The current definition (as of Rel-11) of the measurement events are as follows:

DORMANT CELL RRM MEASUREMENT REPORTING

RELATED APPLICATION

This application was originally filed as Patent Cooperation Treaty Application No. PCT/EP2014/055131 filed Mar. 14, 2014.

FIELD OF THE INVENTION

The present invention relates to apparatuses, methods, systems, computer programs, computer program products and computer-readable media regarding dormant cell RRM (Radio Resource Management) measurement reporting.

BACKGROUND OF THE INVENTION

The present invention relates to LTE-Advanced system which will be part of 3GPP LTE Release 12. More specifically, the present invention focuses on small cell ON/OFF switching enhancement and related discovery procedures. "Small Cell Enhancements—Physical-layer Aspects" Work Item is currently ongoing in 3GPP and is lead by RAN WG1 (Work Item description (WID) in document [1]). One of the topics discussed intensively is the small cell on/off operation: the basic idea is to facilitate on/off switching of the small cells to e.g. reduce network energy consumption as well as interference during the times when the network load is low. The WID states the following:

"Discovery procedure/signal(s) are needed
  Cells operating a cell on/off may transmit discovery signal(s) supporting at least for cell identification, coarse time/frequency synchronization, intra-/inter-frequency RRM measurement of cells and QCL. (Note that QCL is not always necessary or possible depending on the procedure.)
  This includes support of discovery and measurement enhancement(s) in DL and its usage in related procedures."

The topic was further discussed in the 3GPP RAN1 meeting #76 with the following main agreements:
  Discovery signals are used for RSRP and RSRQ—like RRM measurements
  Discovery signals include PSS and one or more of (SSS, CRS, CSI-RS, PRS)

The present invention relates to the discovery procedure and the related RRM measurements and related reporting mechanisms based on Discovery Signals (DS).

Based on the decisions and discussions in RAN1, the focus of small cell on/off and discovery enhancements is on semi-static time scales. More specifically, the work aims at improving the efficiency of currently available on/off mechanism by facilitating shorter transition times to/from eNB dormant (i.e. OFF) period. There are two primary ways of achieving this:
  1. Enhancements to UE procedures related to cell activation/deactivation, handover etc. to reduce the transitions times between the ON and dormant states.
  2. Transmission of DL discovery signals to facilitate timely discovery of dormant cells.

The basic setting is illustrated in FIG. 1. During e.g. low network load, in a period 11 in which the cell is on, the network may decide to turn a cell off. The decision to turn the cell off is followed by an on-off transition period 12, during which the network empties the cells that are to be turned OFF from UEs, using e.g. handover, connection release, redirecting RRC_IDLE mode UEs to different frequency layers etc. Once the network is satisfied that there are no longer UEs camping on the cells to be turned OFF it may decide to turn the cell off and start a dormancy period 13. During the dormancy period 13, an eNodeB may still transmit (e.g. periodically) some DL signals to allow for the UEs supporting the dormant mode to discover and measure the dormant cell.

Further, when there is high network load, the network may decide to turn the cell on and after an Off-On transition period 14, the cell is ON during period 15.

The first above mentioned enhancement (enhanced UE procedures to reduce cell on/off transition times) generally falls outside of the scope of RAN1, and also outside of the scope of the present invention. However, the second enhancement (discovery signal) is of greater significance to 3GPP RAN1, and the present invention focuses on the discovery signals and the related UE measurements and reporting.

The scenario in which the UE needs to perform RRM measurements based on discovery signals (DS) may comprise three types of cells even on the same frequency layer, as indicated in FIG. 2.
  1. Legacy cells 21 not applying ON/OFF and not transmitting any discovery signals (apart from PSS/SSS/CRS)
  2. Rel-12 cells 22 transmitting discovery signals and that are turned OFF
  3. Rel-12 cells 23 transmitting discovery signals and that are turned ON The UE should report to the eNodeB the RRM measurements (namely RSRP & RSRQ) that are needed for making the decision on which cell the UE should be handed over to, or in the case of carrier aggregation, which cell(s) should be configured and/or activated to the UE as an SCell. In order to assist in the network in this decision making, several measurement events have been defined in E-UTRAN. The current definition (as of Rel-11) of the measurement events are as follows:
  Event A1: Serving (cell) becomes better than threshold
  Event A2: Serving (cell) becomes worse than threshold
  Event A3: Neighbour (cell) becomes offset better than PCell
  Event A4: Neighbour (cell) becomes better than threshold
  Event A5: PCell becomes worse than threshold1 and neighbour (cell) becomes better than threshold2
  Event A6: Neighbour (cell) becomes offset better than SCell
  Event B1: Inter RAT neighbour (cell) becomes better than threshold
  Event B2: PCell becomes worse than threshold1 and inter RAT neighbour (cell) becomes better than threshold2

The problem with event based reporting in the context of small cell ON/OFF operation is that the events do not consider the ON/OFF state of the cell. Instead, all cells use the same reporting criteria and trigger reports in the same way. Also, from network point of view, it can make sense to e.g. prioritize cells that are already ON in the selection of the cell for a given UE, even if another (OFF) cell would have slightly higher RSRP/RSRQ. It may also be desirable to have the events trigger differently for ON and OFF cells (e.g. it might be desirable that a report for an OFF-cell triggers more slowly than for an ON-cell). In this way, the additional interference and energy consumption resulting from a small cell being turned on can be avoided, when possible. Present measurement definitions do not permit for this kind of prioritization since eNB does not obtain information from the cell activity status, or cannot make the UE report cells differently based on their activation status. The current specifications do admit some freedom in e.g. allowing a different cell-specific offsets for a group of cells or different time-to-trigger for a group cells, but these methods do not consider the ON/OFF-state of a cell, either (since it hasn't existed before this).

Another problem related to DS based RRM measurements results from the design of the DS (which is currently open in the 3GPP). It has been agreed in RAN1#76 meeting that DS shall include at least PSS and additionally one or more of SSS/CRS/CSI-RS/PRS. However, on a legacy carrier, RRM measurements and cell discovery is always based on PSS/SSS/CRS. If the DS agreed for Rel-12 in 3GPP consists of signals other than the ones used in the legacy case, the accuracy and the performance of the measurements will inevitable be different (maybe better, maybe worse) from that of when using legacy measurement procedures. This also means that with the current criteria, ON-cells and OFF-cells could potentially be compared against each other even if their measurement results are based on different reference symbols or e.g. different L1/L3 filtering mechanism or filter length. Furthermore, the network may also want to prioritize or deprioritize e.g. UE reporting of legacy cells to maximize the benefits of small cell ON/OFF operation.

Document [5] has mainly addressed the structure and the configuration of Discovery Signals. For example, this document discusses the option of having the discovery signal based on PSS/SSS/CRS, and the details of configuring them.

The feature of Target Cell-specific TTT has been approved to Rel-12 in the context of Hetnet Mobility WI—see document [2].

The Cell Individual Offset (CIO) has been specified to LTE in Rel-8, and has existed in UMTS before that. See document [3] for more details.

There has been no discussion in the 3GPP so far related to the details of RRM measurement reporting for DS based RRM measurements. The RAN1 "LS on small cell on/off and discovery" (cf. document [4]) was briefly discussed in the RAN2#85 meeting but no actions were taken so far to consider the impacts to RAN2 aspects.

RELATED DOCUMENTS

[1]: RP-132073, "Small Cell Enhancements-Physical-layer Aspects", 3GPP TSG RAN Meeting #62, Busan, Korea, Dec. 3-6, 2013
[2]: R2-141022, "CR on introduction of Cell-specific time-to-trigger", 3GPP TSG-RAN2 Meeting #85, Prague, Czech Republic, 10-14 Feb. 2014
[3]: 3GPP TS 36.331, V8.20.0, June 2013
[4]: R2-140965, "LS on small cell on/off and discovery", 3GPP TSG-RAN WG2 Meeting #85, Prague, Czech Republic, 10-14 Feb. 2014
[5]: WO2013135295

SUMMARY OF THE INVENTION

It is therefore an object of the present invention to overcome the above mentioned problems and to provide apparatuses, methods, systems, computer programs, computer program products and computer-readable media regarding dormant cell RRM (Radio Resource Management) measurement reporting.

According to an aspect of the present invention there is provided a method comprising:
configuring, at a base station, a measurement configuration message for causing user equipment served by the base station to perform and report measurements on cells,
the measurement configuration message comprising information indicating criteria impacting a measurement reporting procedure with respect to the cells,
the said criteria being related to at least one of the state of a cell, a type of a cell, and a type of a signal used for the measurements of the cells, and
transmitting said configured measurement configuration message to the user equipment.

According to another aspect of the present invention there is provided a method comprising:
receiving, at a user equipment, from a serving base station, a measurement configuration message for causing the user equipment to perform and report measurements on cells,
the measurement configuration message comprising information indicating criteria impacting a measurement reporting procedure with respect to the cells,
the said criteria being related to at least one of the state of a cell, a type of a cell, and a type of a signal used for the measurements of the cells,
performing the measurement and composing a measurement report based on the measurement configuration message, and
transmitting the measurement report to the base station.

According to another aspect of the present invention there is provided an apparatus comprising:
at least one processor, and
at least one memory for storing instructions to be executed by the processor, wherein
the at least one memory and the instructions are configured to, with the at least one processor, cause the apparatus at least to perform a method according to any one of the above aspects.

According to another aspect of the present invention there is provided a computer program product comprising code means adapted to produce steps of any of the methods as described above when loaded into the memory of a computer.

According to a still further aspect of the invention there is provided a computer program product as defined above, wherein the computer program product comprises a computer-readable medium on which the software code portions are stored.

According to a still further aspect of the invention there is provided a computer program product as defined above, wherein the program is directly loadable into an internal memory of the processing device.

According to another aspect of the present invention there is provided an apparatus comprising:
means for configuring, at a base station, a measurement configuration message for causing user equipment served by the base station to perform and report measurements on cells,
the measurement configuration message comprising information indicating criteria impacting a measurement reporting procedure with respect to the cells,
said criteria being related to at least one of the state of a cell, a type of a cell, and a type of a signal used for the measurements of the cells, and
means for transmitting said configured measurement configuration message to the user equipment.

According to another aspect of the present invention there is provided an apparatus comprising:

means for receiving, at a user equipment, from a serving base station, a measurement configuration message for causing the user equipment to perform and report measurements on cells, the measurement configuration message comprising information indicating criteria impacting a measurement reporting procedure with respect to the cells, said criteria being related to at least one of the state of a cell, a type of a cell, and a type of a signal used for the measurements of the cells, and means for performing the measurement and composing a measurement report based on the measurement configuration message, and means for transmitting the measurement report to the base station.

Further aspects and features according to example versions of the present invention are set out in the appending claims.

BRIEF DESCRIPTION OF THE DRAWINGS

These and other objects, features, details and advantages will become more fully apparent from the following detailed description of aspects/embodiments of the present invention which is to be taken in conjunction with the appended drawings, in which:

FIG. 2 is a diagram illustrating three types of cells existing from UE discovery point of view;

DETAILED DESCRIPTION

Figure 1:
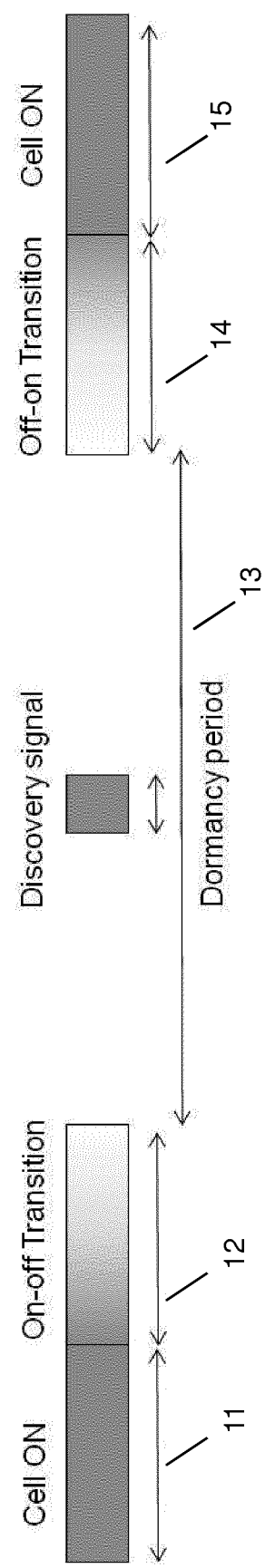
FIG. 1 is a diagram illustrating time frame of operation of ON-OFF switching of a small cell.

In the following, some example versions of the disclosure and embodiments of the present invention are described with reference to the drawings. For illustrating the present invention, the examples and embodiments will be described in connection with a cellular communication network based on a 3GPP based communication system, for example an LTE/LTE-A based system. However, it is to be noted that the present invention is not limited to an application using such type of communication system or communication network, but is also applicable in other types of communication systems or communication networks and the like.

The following examples versions and embodiments are to be understood only as illustrative examples. Although the specification may refer to "an", "one", or "some" example version(s) or embodiment(s) in several locations, this does not necessarily mean that each such reference is to the same example version(s) or embodiment(s), or that the feature only applies to a single example version or embodiment. Single features of different embodiments may also be combined to provide other embodiments. Furthermore, words "comprising" and "including" should be understood as not limiting the described embodiments to consist of only those features that have been mentioned and such example versions and embodiments may also contain also features, structures, units, modules etc. that have not been specifically mentioned.

The basic system architecture of a communication network where examples of embodiments of the invention are applicable may comprise a commonly known architecture of one or more communication systems comprising a wired or wireless access network subsystem and a core network. Such an architecture may comprise one or more communication network control elements, access network elements, radio access network elements, access service network gateways or base transceiver stations, such as a base station (BS), an access point or an eNB, which control a respective coverage area or cell and with which one or more communication elements or terminal devices such as a UE or another device having a similar function, such as a modem chipset, a chip, a module etc., which can also be part of a UE or attached as a separate element to a UE, or the like, are capable to communicate via one or more channels for transmitting several types of data. Furthermore, core network elements such as gateway network elements, policy and charging control network elements, mobility management entities, operation and maintenance elements, and the like may be comprised.

The general functions and interconnections of the described elements, which also depend on the actual network type, are known to those skilled in the art and described in corresponding specifications, so that a detailed description thereof is omitted herein. However, it is to be noted that several additional network elements and signaling links may be employed for a communication to or from a communication element or terminal device like a UE and a communication network control element like a radio network controller, besides those described in detail herein below.

The communication network is also able to communicate with other networks, such as a public switched telephone network or the Internet. The communication network may also be able to support the usage of cloud services. It should be appreciated that BSs and/or eNBs or their functionalities may be implemented by using any node, host, server or access node etc. entity suitable for such a usage.

Furthermore, the described network elements and communication devices, such as terminal devices or user devices like UEs, communication network control elements of a cell, like a BS or an eNB, access network elements like APs and the like, as well as corresponding functions as described herein may be implemented by software, e.g. by a computer program product for a computer, and/or by hardware. In any case, for executing their respective functions, correspondingly used devices, nodes or network elements may comprise several means, modules, units, components, etc. (not shown) which are required for control, processing and/or communication/signaling functionality. Such means, modules, units and components may comprise, for example, one or more processors or processor units including one or more processing portions for executing instructions and/or programs and/or for processing data, storage or memory units or means for storing instructions, programs and/or data, for serving as a work area of the processor or processing portion and the like (e.g. ROM, RAM, EEPROM, and the like), input or interface means for inputting data and instructions by software (e.g. floppy disc, CD-ROM, EEPROM, and the like), a user interface for providing monitor and manipulation possibilities to a user (e.g. a screen, a keyboard and the like), other interface or means for establishing links and/or connections under the control of the processor unit or portion (e.g. wired and wireless interface means, radio interface means comprising e.g. an antenna unit or the like, means for forming a radio communication part etc.) and the like, wherein respective means forming an interface, such as a radio communication part, can be also located on a remote site (e.g. a radio head or a radio station etc.). It is to be noted that in the present specification processing portions should not be only considered to represent physical portions of one or more processors, but may also be considered as a logical division of the referred processing tasks performed by one or more processors.

The idea according to certain aspects of the present invention is to signal information to UE that impacts the UE RRM measurement reporting criteria depending on the type or state of the cell (e.g. ON/OFF, type of RS the cell is transmitting etc).

More specifically, the UE should take into account in the RRM measurement reporting one or more of the following aspects:
1. The (explicitly or implicitly known) state of the cell (ON vs. OFF)
2. The (explicitly or implicitly known) type of the cell (legacy cell vs. Rel-12 transmitting DS and applying ON/OFF)
3. Type of the (explicitly or implicitly known) signal used for discovery measurement (e.g. CRS vs. PSS, SSS, CSI-RS or PRS)

The information signaled to the UE, conditional to the aspects above, can be e.g.:
1. an offset to event triggering condition (e.g. separate offsets for ON/OFF cells or specific to comparison of ON-cell against an OFF-cell),
2. modification of the time-to-trigger (TTT) configured for the event (e.g. in case one of the cells involved in the event triggering cell is ON-cell or OFF-cell),
3. a blacklist or whitelist of (e.g. ON or OFF) cells (i.e. list of cells that are the only ones that can trigger an event or list of cells that cannot trigger an event)

In the context of Rel-12, it is envisioned that PCell cannot be in OFF-state. This means that the applicable events for certain aspects of the present invention are A3-A6. However, it is noted that the basic idea according to certain aspects of the present invention is valid also for other events in case the cells they related to can be in ON- or OFF-state.

According to certain aspects of the present invention, upon configuring the discovery RRM measurements and related reporting, the network can configure an offset/bias to be applied to the UE when considering which cells to report.

In an example of certain aspects of the present invention, with the measurement event A3: The entering condition for the event is currently as follows in equation (1):

$$Mn+Ofn+Ocn-Hys>Mp+Ofp+Ocp+Off \quad (1)$$

where Mn is the measurement result of the neighbour cell (OFF-cell in this case), Mp is the measurement result of the serving PCell (ON-cell in this case), Hys is the hysteresis parameter of the event, Ofn and Ofp are the frequency-specific offsets for the neighbour cell and serving cell frequencies (respectively), Ocn and Ocp are the CIOs (Cell Individual Offsets) for the neighboring and serving cells (respectively) and Off is the network-configured handover offset for the event.

For the sake of simplicity, we assume Ofn=Ocn=Hys=Ofp=Ocp=0. With this, the equation (1) reduces to $$Mn>Mp+Off \quad (2)$$

For the idea according to certain aspects of the present invention, this is now further modified to be $$Mn+Ocs>Mp+Off \quad (3)$$

where the Ocs represents the offset specific for the OFF-cells: For ON-cells, Ocs=0 but for the OFF-cells, it can have a non-zero value (configured implicitly or explicitly by the network or pre-determined in specification).

According to other certain aspects of the present invention, the network can configure an offset/bias to the UE TTT (Time-To-Trigger) to be used with event reporting. For example, the TTT used for event-triggering of OFF is as follows: TTT for OFF cells=(baseline TTT for legacy/ON cells)+(an offset value dependent on cell state (e.g. ON/OFF) or used RS type (e.g. CRS/CSI-RS))

According to certain aspects of the present invention, the following procedure takes place at the eNB.

The eNB performs the following operations in supporting discovery signal operation.

First, the network configures the RRM measurement for the UEs. This includes at least coarse timing information of when the UE may perform the measurements (e.g. "measurement gaps" during which UE is expected to do the measurements) as well as the type of signals to measure (e.g. CRS/CSI-RS).

Next, the network configures the UE RRM measurement reporting events. The configuration includes the bias/offset values for different types of measurements (ON/OFF, CRS/CSI-RS, Legacy/Rel-12) depending on the preferred ON/OFF switching strategy.

Then, the network receives the RRM measurement reports from the UE and may deduce from the reports whether the event was triggered by e.g. an ON-cell or OFF-cell, and can therefore use the information in determining which cells to turn ON/OFF, and which cell to configure to the UE as SCell as a target cell for handover.

According to certain aspects of the present invention, the following procedure takes place at the UE.

First, the UE may receive the RRM measurement reporting configuration from the network including:
Timing of the measurements
Types of signal to measure
Reporting events
Reporting offset/bias and the target for the bias This may include any combination of at least bias for the measurement result, bias for the TTT and a blacklist/whitelist of cells (i.e. whitelist is a list of the cells that are applicable for the measurement reporting with other cells being excluded, blacklist is a list of the cells that are not applicable for measurement reporting). In case of blacklist/whitelist, the corresponding list of cells may also be provided.

Then, the UE performs the RRM measurements according to set instructions.

Finally, the UE reports the RRM measurements to the network taking into account the configured reporting events as well as the offset/bias.

In the following, a more general description of certain embodiments of the present invention is made with respect to FIGS. 3 to 6.

Figure 3:
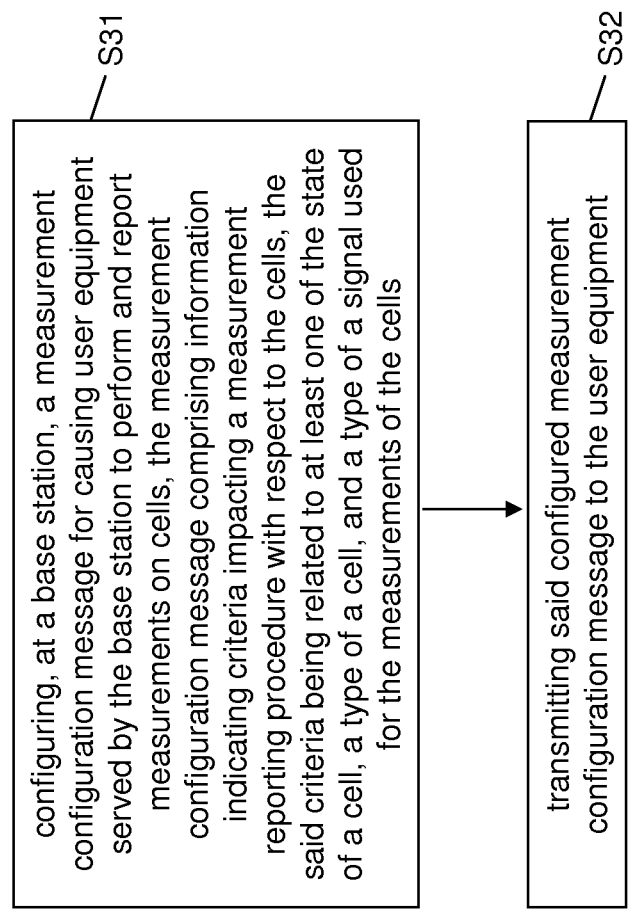
FIG. 3 is a flowchart illustrating an example of a method according to example versions of the present invention.

FIG. 3 is a flowchart illustrating an example of a method according to example versions of the present invention.

According to example versions of the present invention, the method may be implemented in a RAN node, like e.g. a base station, NB or eNB, or the like. In step S31, the method comprises configuring, at a base station, a measurement configuration message for causing user equipment served by the base station to perform and report measurements on cells. The measurement configuration message comprises information indicating criteria impacting a measurement reporting procedure with respect to the cells, said criteria being related to at least one of the state of a cell, a type of a cell, and a type of a signal used for the measurements of the cells. Further, the method comprises transmitting said configured measurement configuration message to the user equipment in a step S32.

According to example versions of the present invention, the method further comprises receiving, at the base station, a measurement report from the user equipment, and determining, based on the received measurement report, which cells to turn ON/OFF and which cell to configure as target cell for the user equipment.

According to example versions of the present invention, an offset is added to an event triggering condition depending on the state of the measured cell.

According to example versions of the present invention, an offset is added to a time-to-trigger depending on the state of the measured cell.

According to example versions of the present invention, the information includes a list of cells which are capable of triggering an event.

According to example versions of the present invention, the information includes a list of cells which are not capable of triggering an event.

According to example versions of the present invention, the measurement configuration message includes timing information of when the user equipment should perform the measurements and reporting events.

According to example versions of the present invention, the state of the cell is an ON state or an OFF state of the cell.

According to example versions of the present invention, the cell is any one of a cell not supporting ON/OFF, a cell supporting ON/OFF and transmitting discovery signals and applying ON/OFF and cell supporting ON/OFF and transmitting discovery signals and not applying ON/OFF.

According to example versions of the present invention, the signal is one or more of a cell-specific reference signal, a channel state information reference signal, discovery signal, primary synchronization signal, secondary synchronization signal, and a positioning reference signal.

Figure 4:
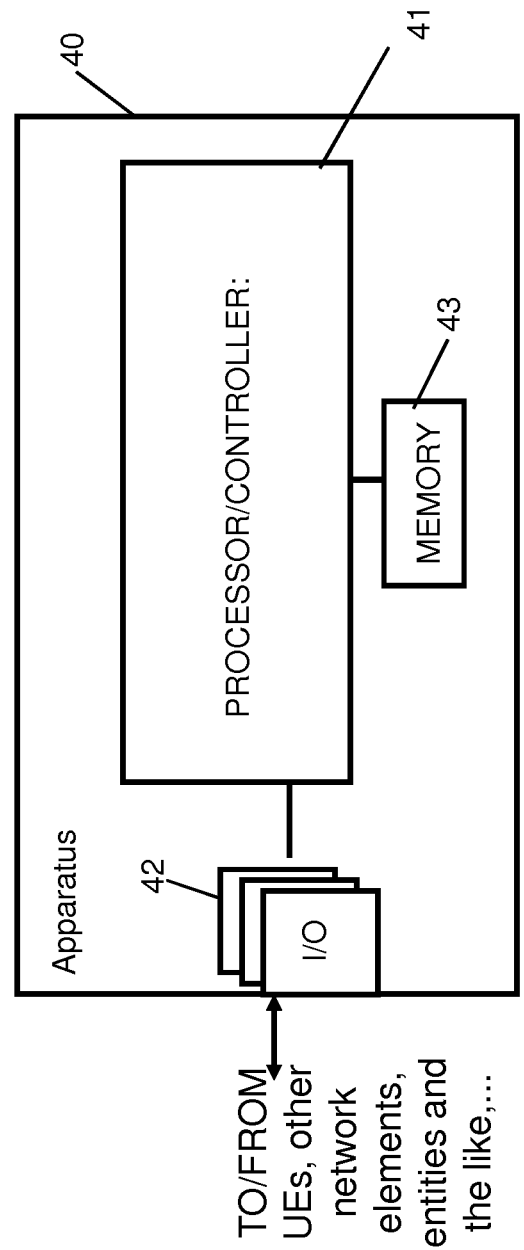
FIG. 4 is a diagram illustrating an example of an apparatus according to example versions of the present invention.

FIG. 4 is a block diagram showing an example of an apparatus according to example versions of the present invention.

In FIG. 4, a block circuit diagram illustrating a configuration of an apparatus 40 is shown, which is configured to implement the above described aspects of the invention. It is to be noted that the apparatus 40 shown in FIG. 4 may comprise several further elements or functions besides those described herein below, which are omitted herein for the sake of simplicity as they are not essential for understanding the invention. Furthermore, the apparatus may be also another device having a similar function, such as a chipset, a chip, a module etc., which can also be part of an apparatus or attached as a separate element to the apparatus, or the like.

The apparatus 40 may comprise a processing function or processor 41, such as a CPU or the like, which executes instructions given by programs or the like related to the flow control mechanism. The processor 41 may comprise one or more processing portions dedicated to specific processing as described below, or the processing may be run in a single processor. Portions for executing such specific processing may be also provided as discrete elements or within one or more further processors or processing portions, such as in one physical processor like a CPU or in several physical entities, for example. Reference sign 42 denotes transceiver or input/output (I/O) units (interfaces) connected to the processor 41. The I/O units 42 may be used for communicating with one or more other network elements, entities, terminals or the like. The I/O units 42 may be a combined unit comprising communication equipment towards several network elements, or may comprise a distributed structure with a plurality of different interfaces for different network elements. Reference sign 43 denotes a memory usable, for example, for storing data and programs to be executed by the processor 41 and/or as a working storage of the processor 41.

The processor 41 is configured to execute processing related to the above described aspects. In particular, the apparatus 40 may be implemented in or may be part of a RAN node, like e.g. a base station, NB or eNB, or the like, and may be configured to perform a method as described in connection with FIG. 3. Thus, the processor 41 is configured to perform configuring a measurement configuration message for causing user equipment served by the base station to perform and report measurements on cells, the measurement configuration message comprising information indicating criteria impacting a measurement reporting procedure with respect to the cells, the said criteria being related to at least one of the state of a cell, a type of a cell, and a type of a signal used for the measurements of the cells, and transmitting said configured measurement configuration message to the user equipment.

Figure 5:
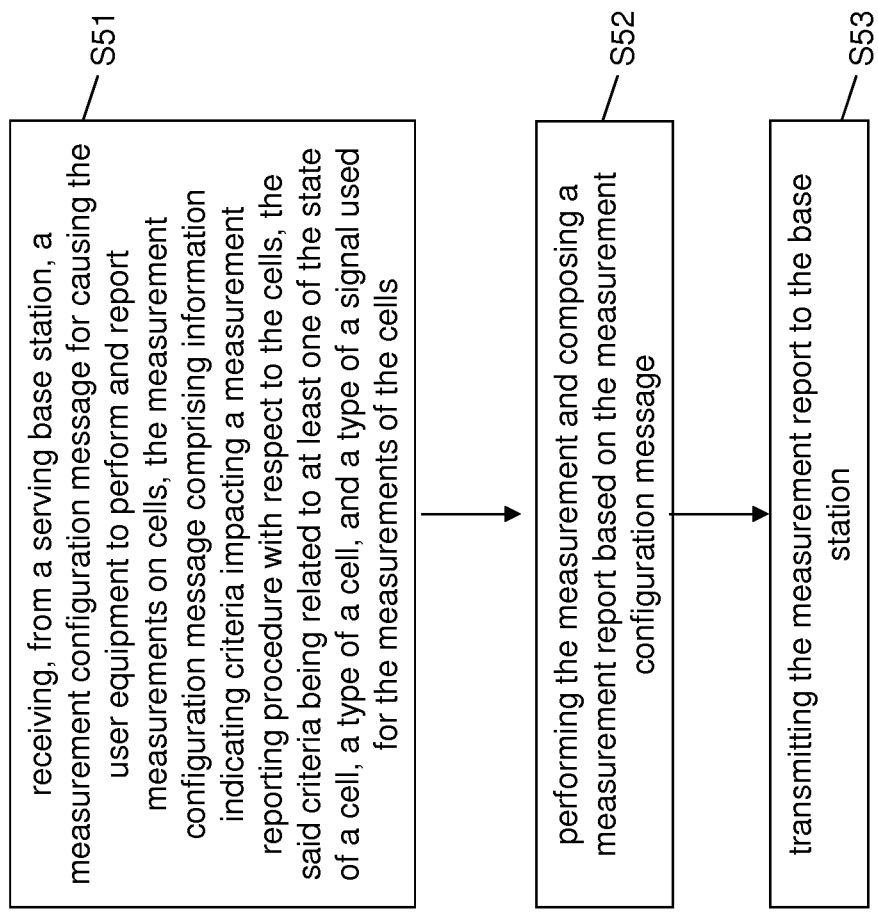
FIG. 5 is a flowchart illustrating another example of a method according to example versions of the present invention.

FIG. 5 is a flowchart illustrating another example of a method according to example versions of the present invention.

According to example versions of the present invention, the method may be implemented in a user equipment, and the like, and comprises receiving, at the user equipment, from a serving base station, a measurement configuration message for causing the user equipment to perform and report measurements on cells in a step S51. The measurement configuration message comprises information indicating criteria impacting a measurement reporting procedure with respect to the cells, said criteria being related to at least one of the state of a cell, a type of a cell, and a type of a signal used for the measurements of the cells. Further, the method comprises performing the measurement and composing a measurement report based on the measurement configuration message in a step S52, and transmitting the measurement report to the base station in a step S53.

According to example versions of the present invention, an offset is added to an event triggering condition depending on the state of the measured cell.

According to example versions of the present invention, an offset is added to a time-to-trigger depending on a state of the measured cell.

According to example versions of the present invention, the information includes a list of cells which are capable of triggering an event.

According to example versions of the present invention, the information includes a list of cells which are not capable of triggering an event.

According to example versions of the present invention, the measurement configuration message includes timing information of when the user equipment should perform the measurements and reporting events.

According to example versions of the present invention, the state of the cell is an ON state or an OFF state of the cell.

According to example versions of the present invention, the cell is any one of a cell not supporting ON/OFF, a cell supporting ON/OFF and transmitting discovery signals and applying ON/OFF and cell supporting ON/OFF and transmitting discovery signals and not applying ON/OFF.

According to example versions of the present invention, the signal is one or more of a cell-specific reference signal, a channel state information reference signal, discovery signal, primary synchronization signal, secondary synchronization signal, and a positioning reference signal.

Figure 6:
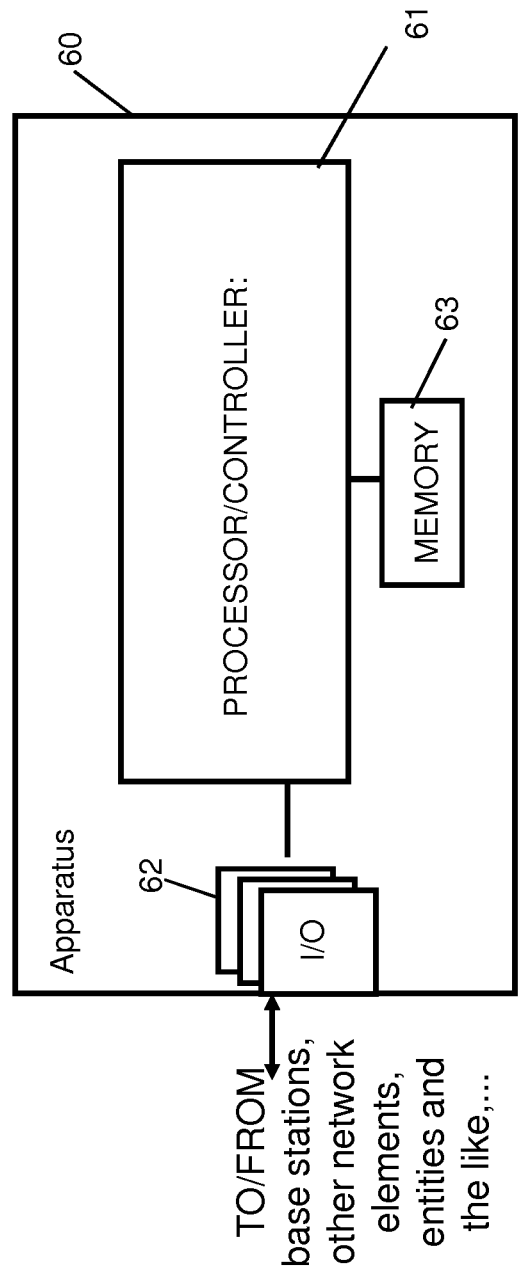
FIG. 6 is a diagram illustrating another example of an apparatus according to example versions of the present invention.

FIG. 6 is a block diagram showing an example of an apparatus according to example versions of the present invention.

In FIG. 6, a block circuit diagram illustrating a configuration of an apparatus 60 is shown, which is configured to implement the above described aspects of the invention. It is to be noted that the apparatus 60 shown in FIG. 6 may comprise several further elements or functions besides those described herein below, which are omitted herein for the sake of simplicity as they are not essential for understanding the invention. Furthermore, the apparatus may be also another device having a similar function, such as a chipset, a chip, a module etc., which can also be part of an apparatus or attached as a separate element to the apparatus, or the like.

The apparatus 60 may comprise a processing function or processor 61, such as a CPU or the like, which executes instructions given by programs or the like related to the flow control mechanism. The processor 61 may comprise one or more processing portions dedicated to specific processing as described below, or the processing may be run in a single processor. Portions for executing such specific processing may be also provided as discrete elements or within one or more further processors or processing portions, such as in one physical processor like a CPU or in several physical entities, for example. Reference sign 62 denotes transceiver or input/output (I/O) units (interfaces) connected to the processor 61. The I/O units 62 may be used for communicating with one or more other network elements, entities, terminals or the like. The I/O units 62 may be a combined unit comprising communication equipment towards several network elements, or may comprise a distributed structure with a plurality of different interfaces for different network elements. Reference sign 63 denotes a memory usable, for example, for storing data and programs to be executed by the processor 61 and/or as a working storage of the processor 61.

The processor 61 is configured to execute processing related to the above described aspects. In particular, the apparatus 60 may be implemented in or may be part of a user equipment, and the like, and may be configured to perform a method as described in connection with FIG. 5. Thus, the processor 61 is configured to perform receiving, from a serving base station, a measurement configuration message for causing the user equipment to perform and report measurements on cells, the measurement configuration message comprising information indicating criteria impacting a measurement reporting procedure with respect to the cells, the said criteria being related to at least one of the state of a cell, a type of a cell, and a type of a signal used for the measurements of the cells, performing the measurement and composing a measurement report based on the measurement configuration message, and transmitting the measurement report to the base station.

For further details regarding the functions of the apparatuses 40 and 60, respectively, reference is made to the description of the respective methods in connection with FIGS. 4 and 6.

According to certain aspects of the present invention, the following advantages are achieved.

Certain aspects of the present invention allows for the network to prioritize the RRM reporting for cells of a specific type or state, such as legacy cells, ON cells etc.

Further, certain aspects of the present invention help in optimizing Small cell ON/OFF operation as the network can ensure it gets the RRM measurements when and only when needed, depending on the strategy it applies with respect to small cell ON/OFF switching.

In the foregoing exemplary description of the apparatuses, only the units/means that are relevant for understanding the principles of the invention have been described using functional blocks. The apparatus may comprise further units/means that are necessary for its respective operation, respectively. However, a description of these units/means is omitted in this specification. The arrangement of the functional blocks of the apparatus is not construed to limit the invention, and the functions may be performed by one block or further split into sub-blocks.

When in the foregoing description it is stated that the apparatus (or some other means) is configured to perform some function, this is to be construed to be equivalent to a description stating that a (i.e. at least one) processor or corresponding circuitry, potentially in cooperation with computer program code stored in the memory of the respective apparatus, is configured to cause the apparatus to perform at least the thus mentioned function. Also, such function is to be construed to be equivalently implementable by specifically configured circuitry or means for performing the respective function (i.e. the expression "unit configured to" is construed to be equivalent to an expression such as "means for").

For the purpose of the present invention as described herein above, it should be noted that
- method steps likely to be implemented as software code portions and being run using a processor at an apparatus (as examples of devices, apparatuses and/or modules thereof, or as examples of entities including apparatuses and/or modules therefore), are software code independent and can be specified using any known or future developed programming language as long as the functionality defined by the method steps is preserved;
- generally, any method step is suitable to be implemented as software or by hardware without changing the idea of the aspects/embodiments and its modification in terms of the functionality implemented;
- method steps and/or devices, units or means likely to be implemented as hardware components at the above-defined apparatuses, or any module(s) thereof, (e.g., devices carrying out the functions of the apparatuses according to the aspects/embodiments as described above) are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components;
- devices, units or means (e.g. the above-defined apparatuses, or any one of their respective units/means) can be implemented as individual devices, units or means, but this does not exclude that they are implemented in a distributed fashion throughout the system, as long as the functionality of the device, unit or means is preserved;

an apparatus may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;

a device may be regarded as an apparatus or as an assembly of more than one apparatus, whether functionally in cooperation with each other or functionally independently of each other but in a same device housing, for example.

In general, it is to be noted that respective functional blocks or elements according to above-described aspects can be implemented by any known means, either in hardware and/or software, respectively, if it is only adapted to perform the described functions of the respective parts. The mentioned method steps can be realized in individual functional blocks or by individual devices, or one or more of the method steps can be realized in a single functional block or by a single device.

Generally, any method step is suitable to be implemented as software or by hardware without changing the idea of the present invention. Devices and means can be implemented as individual devices, but this does not exclude that they are implemented in a distributed fashion throughout the system, as long as the functionality of the device is preserved. Such and similar principles are to be considered as known to a skilled person.

Software in the sense of the present description comprises software code as such comprising code means or portions or a computer program or a computer program product for performing the respective functions, as well as software (or a computer program or a computer program product) embodied on a tangible medium such as a computer-readable (storage) medium having stored thereon a respective data structure or code means/portions or embodied in a signal or in a chip, potentially during processing thereof.

It is noted that the aspects/embodiments and general and specific examples described above are provided for illustrative purposes only and are in no way intended that the present invention is restricted thereto. Rather, it is the intention that all variations and modifications which fall within the scope of the appended claims are covered.

Abbreviations:
LTE Long Term Evolution
3GPP Third Generation Partnership Program
CIO Cell Individual Offset
CRS Cell-specific Reference Signal
CSI-RS Channel State Information-Reference Signal
DCI Downlink Control Information
DL Downlink
DS Discovery Signal
eNB eNode B (Base Station)
FDD Frequency Division Duplexing
HARQ Hybrid Automatic Repeat Request
MAC Medium Access Control
MIB Master Information Block
NSN Nokia Solutions and Networks
PSS Primary Synchronization Signal
PCell Primary Cell
PCI Physical Cell ID
PDCCH Physical Downlink Control Channel
PDSCH Physical Downlink Shared Channel
PHY Physical (layer)
PRS Positioning Reference Signal
QCL Quasi-Collocation
RAN Radio Access Network
RAT Radio Access Technology
Rel Release
RRM Radio Resource Management
RSRP Reference Signal Received Power
RSRQ Reference Signal Received Quality
RSTD Received Signal Time Difference
SCell Secondary Cell
SIB-1 System Information Block #1
SSS Secondary Synchronization Signal
TD-LTE Time Division (TDD) LTE
TTT Time-to-trigger
UE User Equipment
UL, U Uplink
WG Working Group

The invention claimed is:

1. A method, comprising:
configuring, at a base station, a measurement configuration message for causing user equipment served by the base station to perform and report measurements on cells,
the measurement configuration message comprising information indicating criteria impacting a measurement reporting procedure with respect to the cells,
the said criteria being related to at least one of the state of a cell, a type of a cell, and a type of a signal used for the measurements of the cells, and
transmitting said configured measurement configuration message to the user equipment,
wherein an offset is added to an event triggering condition depending on the state of the measured cell, and
wherein the state of the cell is an ON state or an OFF state of the cell.

2. The method according to claim 1, further comprising receiving, at the base station, a measurement report from the user equipment, and
determining, based on the received measurement report, which cells to turn ON/OFF and which cell to configure as target cell for the user equipment.

3. The method according to claim 1, wherein
an offset is added to a time-to-trigger depending on the state of the measured cell.

4. The method according to claim 1, wherein
the information includes a list of cells which are capable of triggering an event.

5. The method according to claim 1, wherein
the information includes a list of cells which are not capable of triggering an event.

6. The method according to claim 1, wherein
the measurement configuration message includes timing information of when the user equipment should perform the measurements and reporting events.

7. The method according to claim 1, wherein
the cell is any one of a cell not supporting ON/OFF, a cell supporting ON/OFF and transmitting discovery signals and applying ON/OFF and cell supporting ON/OFF and transmitting discovery signals and not applying ON/OFF.

8. The method according to claim 1, wherein
the signal is one or more of a cell-specific reference signal, a channel state information reference signal, discovery signal, primary synchronization signal, secondary synchronization signal, and a positioning reference signal.

9. A method, comprising:

receiving, at a user equipment, from a serving base station, a measurement configuration message for causing the user equipment to perform and report measurements on cells, the measurement configuration message comprising information indicating criteria impacting a measurement reporting procedure with respect to the cells, the said criteria being related to at least one of the state of a cell, a type of a cell, and a type of a signal used for the measurements of the cells, performing the measurement and composing a measurement report based on the measurement configuration message, and transmitting the measurement report to the base station, wherein an offset is added to an event triggering condition depending on the state of the measured cell, and wherein the state of the cell is an ON state or an OFF state of the cell.

10. The method according to claim 9, wherein an offset is added to a time-to-trigger depending on a state of the measured cell.

11. The method according to claim 9, wherein the information includes a list of cells which are capable of triggering an event.

12. The method according to claim 9, wherein the information includes a list of cells which are not capable of triggering an event.

13. The method according to claim 9, wherein the measurement configuration message includes timing information of when the user equipment should perform the measurements and reporting events.

14. The method according to claim 9, wherein the cell is any one of a cell not supporting ON/OFF, a cell supporting ON/OFF and transmitting discovery signals and applying ON/OFF and cell supporting ON/OFF and transmitting discovery signals and not applying ON/OFF.

15. The method according to claim 9, wherein the signal is one or more of a cell-specific reference signal, a channel state information reference signal, discovery signal, primary synchronization signal, secondary synchronization signal and a positioning reference signal.

16. An apparatus comprising at least one processor, and at least one memory for storing instructions to be executed by the processor, wherein the at least one memory and the instructions are configured to, with the at least one processor, cause the apparatus at least to receive from a serving base station, a measurement configuration message for causing a user equipment to perform and report measurements on cells, the measurement configuration message comprising information indicating criteria impacting a measurement reporting procedure with respect to the cells, said criteria being related to at least one of the state of a cell, a type of a cell, and a type of a signal used for the measurements of the cells, and perform the measurement and composing a measurement report based on the measurement configuration message, and transmit the measurement report to the serving base station, wherein an offset is added to an event triggering condition depending on the state of the measured cell, and wherein the state of the cell is an ON state or an OFF state of the cell.

* * * * *